United States Patent
Jiang et al.

(10) Patent No.: US 11,343,828 B2
(45) Date of Patent: May 24, 2022

(54) TRANSMISSIONS BASED ON CANDIDATE RESOURCES OR CANDIDATE RESOURCE GROUPS

(71) Applicant: ZTE Corporation, Guangdong (CN)

(72) Inventors: Chuangxin Jiang, Guangdong (CN); Yijian Chen, Guangdong (CN); Yu Ngok Li, Guangdong (CN); Hao Wu, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 62 days.

(21) Appl. No.: 17/018,379

(22) Filed: Sep. 11, 2020

(65) Prior Publication Data
US 2020/0413416 A1  Dec. 31, 2020

Related U.S. Application Data (63) Continuation of application No. PCT/CN2018/078877, filed on Mar. 13, 2018.

(51) Int. Cl.
*H04W 72/06* (2009.01)
*H04L 5/00* (2006.01)
*H04W 72/04* (2009.01)

(52) U.S. Cl.
CPC ........... *H04W 72/06* (2013.01); *H04L 5/0051* (2013.01); *H04W 72/044* (2013.01)

(58) Field of Classification Search
CPC .............. H04W 72/06; H04W 72/044; H04W 72/1247; H04W 72/042; H04W 72/0406; H04W 36/0072; H04W 36/30; H04W 76/27; H04L 5/0051

USPC ......................................................... 455/513
See application file for complete search history.

(56) References Cited

U.S. PATENT DOCUMENTS

2013/0114547 A1\* 5/2013 Li ..................... H04W 72/042
370/329
2014/0126510 A1   5/2014 Ogawa et al.

FOREIGN PATENT DOCUMENTS

| CN | 101795189 A | 8/2010 |
| CN | 102300313 A | 12/2011 |
| CN | 107734514 A | 2/2018 |

OTHER PUBLICATIONS

International Search Report, PCT/CN2018/078877, dated Nov. 16, 2018, 4 pages.

\* cited by examiner

*Primary Examiner* — Shaima Q Aminzay
(74) *Attorney, Agent, or Firm* — Perkins Coie LLP (57) ABSTRACT

Methods, systems, and devices related to reducing signaling overhead for uplink transmissions are described. In one representative aspect, a method for wireless communication includes transmitting, from the wireless communication node, a first message to a mobile device. The first message identifies one or more resource groups that correspond to a transmission rank to be used by the mobile device for a data transmission from the mobile device to the wireless communication node. The one or more resource groups are selected from a set of candidate resource groups or a set of candidate resources. The method also includes receiving, at the wireless communication node, the data transmission having the transmission rank from the mobile device.

20 Claims, 4 Drawing Sheets

TRANSMISSIONS BASED ON CANDIDATE RESOURCES OR CANDIDATE RESOURCE GROUPS

CROSS-REFERENCE TO RELATED APPLICATION(S)

This patent document is a continuation of and claims benefit of priority to International Patent Application No. PCT/CN2018/078877, filed on Mar. 13, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reducing signaling overhead for reference signal transmissions using a large number of antenna ports.

In one representative aspect, a method for wireless communication is disclosed. The method includes transmitting, from the wireless communication node, a first message to a mobile device. The first message identifies one or more resource groups that correspond to a transmission rank to be used by the mobile device for a data transmission from the mobile device to the wireless communication node. The one or more resource groups are selected from a set of candidate resource groups or a set of candidate resources. The method also includes receiving, at the wireless communication node, the data transmission having the transmission rank from the mobile device.

In another representative aspect, a method for wireless communication is disclosed. The method includes receiving, at a mobile device, a first message from a wireless communication node. The first message identifies one or more resource groups that correspond to a transmission rank to be used by the mobile device for a data transmission from the mobile device to the wireless communication node. The one or more resource groups are selected from a set of candidate resource groups or a set of candidate resources. The method also includes performing, from the mobile device, the data transmission having the transmission rank to the wireless communication node.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

In wireless communication systems, a wireless communication node, such as a base station, often allocates only a partial portion of the full system bandwidth for a specific User Equipment (UE) at a specific time. It is thus desirable for the base station to know which portion(s) across the overall bandwidth has a better channel quality compared to the remaining portion of the full system bandwidth. The UEs can transmit reference signals to the base station (e.g., eNodeB or gNodeB) and using these reference signals, the base station can obtain information on the channel quality of uplink path(s). The network can then allocate a specific frequency region that is the best for each of the UEs. For example, the Sounding Reference Signal (SRS) is a reference signal transmitted by a UE in the uplink direction. The SRS is used by the eNodeB to estimate the uplink channel quality over a bandwidth. The eNodeB may use this information for uplink frequency selective scheduling.

In the current wireless communication systems, two transmission schemes are supported for the Physical Uplink Shared Channel (PUSCH): codebook based transmission and non-codebook based transmission. For codebook based transmissions, the UE determines its PUSCH transmission precoder based on SRS Resource Indicator (SRI), Transmitted Rank Indication (TRI), and Transmitted Precoding Matrix Indicator (TPMI) fields in a Downlink Control Indicator (DCI) message.

For non-codebook based transmissions, the UE can determine its PUSCH precoder and transmission rank based on the wideband SRI field from the DCI. This is because, when channel reciprocity holds (i.e., both downlink and uplink transmission links match, such as in a time division duplexing, or TDD, channel), the channel estimation of the uplink direction at the transmitter can be used directly for link adaptation in the downlink direction. In such cases, UE can calculate uplink precoders based on information provided by the SRI field, such as the resources used for SRS transmissions, thus no codebook is required. For example, the base station can indicate, based on SRS transmissions, resources in SRI field to be used for uplink transmission. The resources can be a subset or all of the SRS resources used for the SRS transmissions. The UE can use the same precoder(s) of one or multiple SRS resources as indicated by the DCI for UL data transmission.

Figure 1:
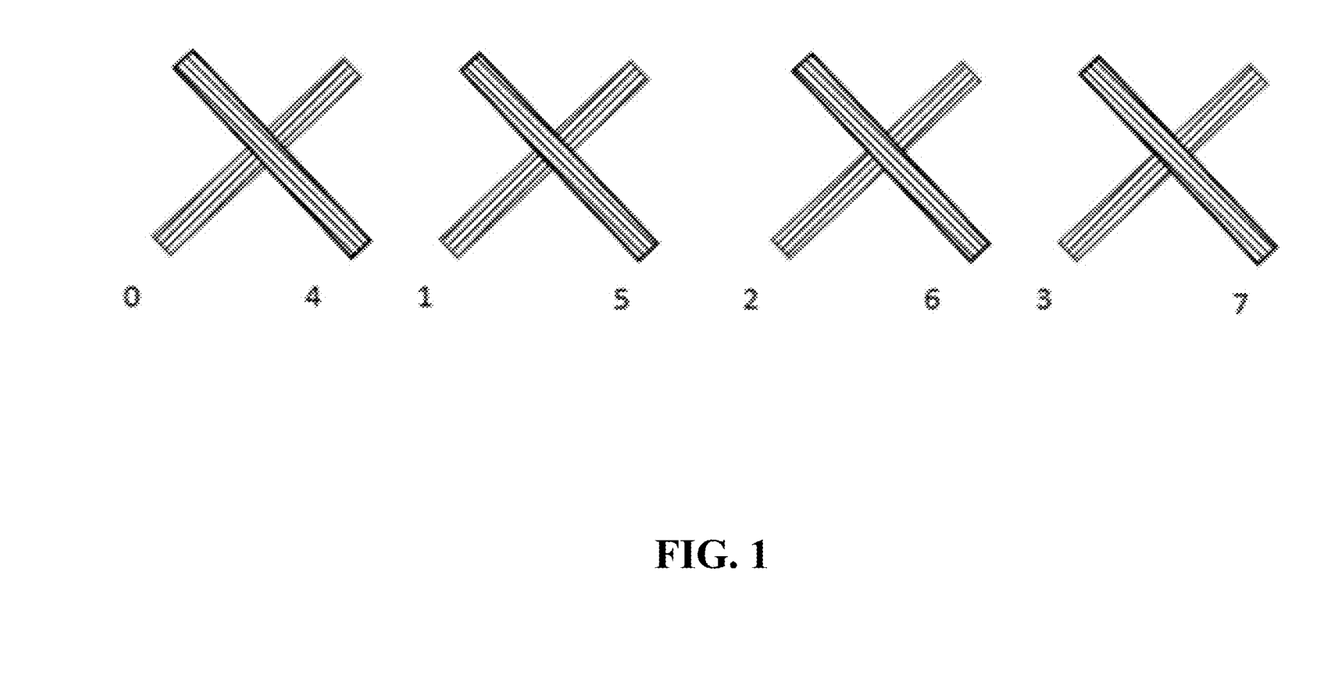
FIG. 1 is a schematic diagram of transmission pattern for eight antenna ports.

Currently, the maximum number of SRS resources that can be configured for non-codebook based uplink transmission is four. UE, however, can support more than four antenna ports for uplink transmission with the advance of wireless communication technology. For example, FIG. 1 shows a schematic diagram of a transmission pattern for eight antenna ports. For an UE that supports rank-8 transmissions (i.e., transmissions using eight antenna ports), the base station can configure a SRS resource set with eight SRS resources, one port for each SRS resource: {r0, r1, r2, r3, r4, r5, r6, r7}. After the UE transmits SRS using the configured SRS resources, the base station can indicate SR resources in the SRS Resource Indicator (SRI) field in the DCI message for PUSCH transmissions. Here, one indicated SRS resource corresponds to one layer transmission. Each PUSCH layer transmission will be based the precoder of indicated SRS resource. However, signaling SRS resources used for SRS transmissions within a large SRS resource set brings additional complexity and signaling overhead. For example, for R-layer transmissions, R number of SRS resources can be indicated as follows in a message:

1.1: For one-layer transmissions, $C_8^1=8$ states are needed to indicate which one of the eight SRS resources is for the data transmission.

1.2: For two-layer transmissions, $C_8^2=28$ states are needed to indicate which two of eight SRS resources are for the data transmission.

1.3: For three-layer transmissions, $C_8^3=56$ states are needed to indicate which three of eight SRS resources are for the data transmission.

1.4: For four-layer transmissions, $C_8^4=70$ states are needed to indicate which four of eight SRS resources are for the data transmission.

Therefore, a total of 8+28+56+70=162 states may be needed to support four-layer transmissions. This means that the downlink control message (e.g., the DCI message) needs to include a field (e.g., SRI) of $\log_2(162)=8$ bits. Even when the UE only supports two-layer transmissions, $\log_2(8+28)=6$ bits are needed in the DCI message. The overhead for direct indication of SRS resources thus becomes unacceptable for efficient downlink control signaling.

This patent disclosure describes various techniques that can be used by various embodiments to reduce signaling overhead for indicating SRS resources used in SRS transmissions for facilitating uplink data transmissions. While the discussions mainly focus on resources used for SRS transmissions, the disclosed techniques can also be applied to other reference signals.

Details of the disclosed techniques are described in the following embodiments.

Example Embodiment 1

This embodiment describes representative ways for the base station to configure one or more sets of candidate resource groups. The resources used for SRS transmissions then can be signaled to the UE based on the one or more sets of candidate resource groups.

For rank-1 transmissions, the base station can determine a set of candidate resource groups, each group having one resource. The number of candidate groups is smaller than $C_8^1=8$. For example, the base station can decide that, among the eight configured resources {r0, r1, r2, ..., r7} in the SRS resource set, only N1=2 resource groups are candidate groups: {r0}, and The candidate groups can be signaled to the UE via higher layer signaling, such as a Radio Resource Control (RRC), Medium Access Control (MAC) Control Element (CE), Master Information Block (MIB), or System Information Block (SIB). The candidate groups can also be predetermined (e.g., agreed upon by both the base station and the UE). Thus, the base station only needs to indicate which group the UE can use in a downlink control message (e.g., a DCI message). Only $C_2^1=2$ possibilities or states are needed for such indication.

For rank-2 transmissions, the base station can determine a set of candidate resource groups, each group having two resources (one per each antenna port). The number of candidate resource groups is smaller than $C_8^2=28$. For example, the base station can decide that, among the eight configured resources {r0, r1, r2, r7} in the SRS resource set, N2=6 resource groups are candidate groups: {r0}, {r0, r2}, {r1, r2}, {r3, r4}, {r4, r5}, and {r4, r6}. The candidate groups can be signaled to the UE via higher layer signaling. The candidate groups can also be predetermined. Only $C_6^1=6$ possibilities are needed for such indication, as compared to $C_8^2=28$ possibilities.

For rank-3 transmissions, the base station can determine a set of candidate resource groups, each group having three resources (one per each antenna port). The number of candidate resource groups is smaller than $C_8^3=56$. For example, the base station can decide that, among the eight configured resources {r0, r1, r2, r7} in the SRS resource set, N3–6 resource groups are candidate groups: {r0, r1, r2}, {r0, r2, r3}, {r1, r2, r3}, {r3, r4, r5}, {r4, r5, r6}, and {r4, r6, r7}. The candidate groups can be signaled to the UE via higher layer signaling. The candidate groups can also be predetermined. Only $C_6^1=6$ possibilities are needed for such indication, as compared to $C_8^3=56$ possibilities.

For rank-4 transmissions, the base station can determine a set of candidate resource groups, each group having four resources (one per each antenna port). The number of candidate resource groups is smaller than $C_8^4=70$. For example, the base station can decide that, among the eight configured resources {r0, r1, r2, r7} in the SRS resource set, N4=8 resource groups are candidate groups: {r0, r1, r2, r3}, {r0, r2, r3, r4}, {r1, r2, r3, r4}, {r2, r3, r4, r5}, {r3, r4, r5, r6}, {r4, r5, r6, r7}, {r2, r4, r6, r7}, and {r3, r4, r6, r7}. The candidate groups can be signaled to the UE via higher layer signaling. The candidate groups can also be predetermined. Only $C_8^1=8$ possibilities are needed for such indication, as compared to $C_8^4=70$ possibilities.

More generally, for transmission in rank-R, the base station can determine NR number of candidate resource groups for a UE that can support maximum Rmax layers transmission, wherein 1≤R≤Rmax. The value of Rmax can be determined based on the capabilities of the UE. The value of Rmax can also be configured by higher-layer signaling. For example, Rmax can be 1, 2, 4, 6, or 8. Its value can also be extended to greater than eight for future generations of mobile devices. Each resource group for rank R transmission includes R number of resources, and NR<$C_{Rmax}^R$. The NR candidate groups for rank R can be predetermined, or signaled to the UE via higher layer signaling. The base station then only needs to signal which group among the NR groups to be used for reference signal transmissions in the downlink message, reducing the number of states from $C_{Rmax}^R$ to $C_{N_R}^1=N_R$ for each rank. The total number of bits needed to signal all states can be reduced to $\log_2(\Sigma_{i=1}^{Rmax}$ $N_j$.) In other words, some resource groups are restricted so that the number of candidate resource groups is less. It is noted that the base station can configure and/or restrict candidate SRS resource groups for each sub-band in a transmission band.

The base station can configure candidate groups for each layer (either by predetermined candidate groups or higher layer signaling), or for all the layers together. In some embodiments, the base station configures candidate resource groups for some but not all ranks. For example, the base station can configure different sets of candidate resource groups for R=2, 3, 4 while leaving all eight resources available for rank-1 transmissions. This way, rank-1 transmissions, which may be more important than transmissions in other ranks, can enjoy more flexibility.

Example Embodiment 2

This embodiment describes representative ways for the base station to configure a set of candidate resources. The resources used for SRS transmissions then can be signaled to the UE based on the set of candidate resources.

For transmissions in rank-R (R≥1), the base station can determine NR number of candidate resources among all resources in a configured resource set. The base station can signal the candidate resources to the UE using a bitmap. For example, eight resources in the SRS resource set are configured for the UE: {r0, r1, r2, r3, r4, r5, r6, r7}. The base station uses a bitmap of eight bits, with each bit representing a SRS resource. When the bit has a value of 1, the corresponding SRS resource is a candidate resource. When the bit has a value of 0, the corresponding SRS resource is considered restricted/inactive. For example, a bitmap 11000000 indicates that resource{r0} and {r1} are the candidate resources. For rank 1 transmission, one of SRS resource r0 and r1 should be indicated for data transmission. For rank 2 transmission, resource r0 and r1 must be used.

The base station can use a separate bitmap for each rank to indicate the candidate resources. In some cases, a bitmap 00000000 for a particular rank indicates that the rank is not supported. The base station can also use one bitmap to indicate the candidate resource groups for all ranks.

In some embodiments, the base station can use the same bitmap for multiple ranks. For example, for rank-1 and rank-2 transmissions, the base station uses a bitmap 11110000 to indicate that the candidate resources are {r0}, {r1}, {r2}, and {r3}. The bitmap can be predetermined or signaled to the UE via higher-layer signaling. The base station can then indicate in the downlink control message which resource(s) to be used. The number of possible states in this case becomes $C_4^1+C_4^2$ instead of $C_8^1+C_8^2$. For transmissions in other ranks, such as rank-3 and rank-4 transmissions, the base station can choose to use a separate bitmap.

In some embodiments, for rank R transmissions, R resources that are selected from the configured resource set as the candidate resources (or to form the candidate resource group). In some implementations, the uplink transmissions are performed on a transmission bands that includes multiple sub-bands. The base station can configure and/or restrict candidate resources for each sub-band. It is noted that the candidate resource group(s) or candidate resources can be used for different sub-bands.

Example Embodiment 3

The embodiment describes that the base station can establish a set of predefined rules to allow the UE to identify the resources for SRS transmissions to determine the precoder(s) for uplink transmissions.

In some embodiments, the base station can define a rule that limits candidate resource group identification based on previous rank(s) (e.g., a candidate resource group for rank R+1 transmissions must include all resources in a candidate resource group for rank R transmissions). For example, the base station determines that the candidate resource groups for rank-1 transmissions include {r0} and {r1}. The candidate resource groups for rank-2 transmissions must include the resources for rank-1 transmissions. For example, the candidate resource groups for rank-2 transmissions can be {r0, r1} and {r3, r4}. These candidate resource groups can be either predefined or signaled to the UE via higher-layer signaling. For rank-3 transmissions, the base station can signal the incremental changes—r2 and r5—to the UE (e.g., using a bitmap) instead of the entire group(s). Based on the predefined rule, the UE can determine that the candidate groups for rank-3 transmissions are {r0, r1, r2} and {r3, r4, r5}.

In some embodiments, the base station can define a rule that limits candidate resource identification based on previous rank(s) (e.g., candidate resources for rank R+1 transmissions must include all candidate resources for rank R transmissions). For example, the base station determines that the candidate resources for rank-1 transmissions include r0 and r1. The candidate resources for rank-2 transmissions must include the candidate resources for rank-1 transmissions. For example, the candidate resources for rank-2 transmissions can be r0, r1, r3, and r4.

In some embodiments, the base station can define a rule that limits the structure of the candidate resource groups (e.g., for rank-R transmissions, each candidate group includes R consecutive resources). For example, for rank-3 transmissions with eight configured resources, the candidate groups are {r0, r1, r2}, {r1, r2, r3}, {r2, r3, r4}, {r3, r4, r5}, {r4, r5, r6}, and {r5, r6, r7}. In some implementations, the last resource and the first resource (e.g., r7 and r0 in a set of eight resources) can be considered as consecutive. Thus, group {r6, r7, r0} can also be a candidate group.

Example Embodiment 4

The embodiment describes additional rules that the base station can establish to allow the UE to identify the resources for SRS transmissions to determine the precoder(s) for uplink transmissions.

In some embodiments, SRS resources are organized in an order based on channel conditions so that the UE can perform uplink transmission using resources that have lower (or higher) indices. Resources can be organized in an order corresponding to better precoder(s) with better channel conditions. Alternatively, the resources may also be organized in a descending order or any other orders known a priori to the UE and the base station, such that the UE is able to select better SRS resources under good channel conditions. For example, the SRS resources are organized based on criteria from the UE's perspective, such as channel reciprocity based on downlink reference signals (e.g., CSI-RS). Typically, an SRS transmission with better precoder and/or signal to noise ratio (SNR) is arranged with SRS resources having lower (or higher) SRS resource indices. Thus, after the SRS transmission, the first (or last) R resources can be used for rank R data transmission.

However, due to unpredictable uplink interferences, the first R resources may not be the best. To allow better transmission quality, additional SR resources can be included a candidate resource set so that the base station can dynamically choose R resources from a set of R+SR candidate resources to provide a good balance between flexibility and signaling overhead. For example, for rank-R transmissions, a set of candidate resources includes first R+SR resources in a configured resource set, wherein R+SR≤M, and M is the number of SRS resources within the configured resource set. For rank R transmissions, the candidate SRS resources can be the first (or last) R+SR resources within a configured SRS resource set. SR can be configured by higher layer signaling. SR can also be known a priori to the base station and/or the UE. The DCI message can include information to dynamically indicate rank R and select R resources from the candidate R+SR resources. In some implementations, the candidate resources are the same as the resources in the configured SRS resource set. In such cases, there is no need for additional signaling to indicate the set of candidate resources. In some embodiments, S1=S2= . . . =SRmax=0. For rank-R transmissions, the first (or last) SRS resources are used. For example, the UE supports maximum 8-layer transmissions. Therefore, $\log_2(8)=3$ bits are needed to indicate the SRS resources. In such cases, SRI and TRI fields in the DCI message are equivalent—when the base station schedules R-layer transmission, SRS resource {r0, r1, . . . rR—1} are used.

In some embodiments, SR>0. For example, S1=S2=S3=2, S4=1, and S5=S6=S7=0. For rank-1 transmissions, the first 1+2=3 SRS resources can be used ($C_3^1$ states). For rank-2 transmissions, the first 2+2=4 resources can be used ($C_4^2$ states). For rank-3 transmissions, the first 3+2=5 resources can be used (q states). For rank-4 transmissions, the first 4+1=5 resources can be used ($C_5^4$ states). For rank-5 to rank-8 transmissions, the first 5, 6, 7, or 8 resources are used (1 state for each rank). The total number of states is 3+6+10+5+4=28, requiring five bits in total in the DCI message. Here SR can be predefined or signaled by higher-layer signaling, and can be separately configured for wideband and sub-bands (e.g., different values for different sub-bands).

It is noted that techniques described in Example Embodiments 1 and 2 can be more suitable for periodic and/or semi-periodic SRS transmissions. For example, higher-layer signaling can be used in these cases to indicate the candidate resource groups. Techniques described in Example Embodiments 3 and 4 can be more suitable for aperiodic SRS transmissions.

Example Embodiment 5

This embodiment describes additional means that the base station can use to configure and signal candidate resources.

In some implementations, the base station can determine candidate resources based on various orders of resources in a resource set. For example, different orders of resources in a configured resource set can be considered as different resource sets. After indicating the various orders (e.g., various resource sets) to the UE, the base station can simply indicate in the downlink control message which order (e.g., resource set) should be used for a particular rank.

For example, a configured resource set for SRS transmissions include eight resources: {r0, r1, r2, r3, r4, r5, r6, r7}. The base station configures the following two resource sets as candidate resource sets (each having a different order):
  Candidate set 1: {r0, r1, r2, r3, r4, r5, r6, r7}
  Candidate set 2: {r5, r3, r2, r0, r1, r4, r7, r6}
These candidate sets can be predetermined, or signaled to the UE via higher-layer signaling. In the DCI message, only one bit is needed by SRI to indicate which candidate set is to be used. For example, for rank-1 transmissions (i.e., TRI=1), if SRI=0 (i.e., candidate set 1), resource {r0} is used. If SRI=1 (i.e., candidate set 2), resource {r5} is used. For rank-3 transmissions (i.e., TRI=3), if SRI=0 (i.e., candidate set 1), resources {r0, r1, r2} are used. If SRI=1 (i.e., candidate set 2), resources {r5, r3, r2} are used.

In some embodiments, SRI and TRI can be combined to indicate the desired resources. For example, four resources in an SRS resource set are configured for SRS transmissions: {r0, r1, r2, r3}. The base station configures the following three resource sets as candidate resource sets:
  Candidate set 1: {r0, r1, r2, r3}
  Candidate set 2: {r3, r2, r0, r1}
  Candidate set 3: {r2, r1, r0, r3}
Table 1 shows a representative way of defining SRI value such that SRS resource can be indicated to the UE via DCI message.

Table 1 SRI Value, Rank, Candidate Index, and SRS Resources

TABLE 1

| SRI value, rank, candidate index, and SRS resources | | | |
|---|---|---|---|
| SRI value | rank | Candidate index | SRS resources |
| 0 | 1 | 0 | 0 |
| 1 | 1 | 1 | 3 |
| 2 | 1 | 2 | 2 |
| 3 | 2 | 0 | 0, 1 |
| 4 | 2 | 1 | 3, 2 |
| 5 | 2 | 2 | 2, 1 |
| 6 | 3 | 0 | 0, 1, 2 |
| 7 | 3 | 1 | 3, 2, 0 |
| 8 | 3 | 2 | 2, 1, 0 |
| 9 | 4 | 0 | 0, 1, 2, 3 |
| 10 | 4 | 1 | 3, 2, 0, 1 |
| 11 | 4 | 2 | 2, 1, 0, 3 |

In some embodiments, the base station can determine various orders of SRS resource in the resource set only for lower-rank transmissions. For example, a configured resource set for SRS transmissions include eight resources: {r0, r1, r2, r3, r4, r5, r6, r7}. The base station configures two resource sets as candidate resource sets for transmissions in rank 1 to 4:
  Candidate set 1: {r0, r2, r1, r3}
  Candidate set 2: {r1, r2, r0, r3}
Thus, for transmissions in rank R=1-4, DCI message can indicate which candidate resources and rank R have been used for SRS transmissions. For transmission in rank R=5 to 8, it can be assumed that the first R SRS resources have been used. In some embodiments, the SRS resource set is configured with N SRS resources. The base station can configure multiple sets of candidate SRS resources that include the same resources in different orders. The SRI(s) in the DCI message can be used to choose one set of candidate resources and/or to indicate rank information (e.g., rank R). Based on the selected set of candidate resources, rank R transmission can use the R resources corresponding to the predefined R resource indices (e.g. the first R, or last R or middle R) within the set of candidate resources. The candidate resource(s) can be organized in the same or a different order as compared to resource in the configured resource set. The number of the sets of candidate resources can be one.

Example Embodiment 6

This embodiment describes examples for a two-stage downlink control transmission scheme for sub-band SRS resource indications.

Sub-band SRS resource indication can be introduced to improve transmission efficiency, especially on a frequency selective channel. In other words, the downlink control message (e.g., DCI) includes a field (e.g., SRI) that indicates SRS resources for each sub-band. In such cases, the signaling overhead varies with the number of scheduled sub-bands. The overhead can become huge when there are large number of scheduled sub-bands. When the number of sub-bands becomes large, a large payload for the downlink control message can pose robustness issues for transmissions on channels such as the Physical Downlink Control Channel (PDCCH).

To address the above issues, a two-stage downlink control transmission scheme can be used. The scheduling signaling can be split into two portions, with each portion piggybacked to one downlink control message. For example, two DCI messages can be used to support the two-stage transmission scheme.

To support sub-band indications, the SRI field can have two categories of information: the first category indicates rank information for the wideband and resource(s)/resource group(s) for a subset of sub-bands, and the second category indicates resource(s)/resource group(s) for remaining sub-bands. The two categories of information can be split into two portions of scheduling information, the first portion for the first category and the second portion for the second category. The number of bits needed for the second portion is smaller because rank information is already included in the first portion.

For example, using the two-stage downlink control transmission scheme, the DCI message can be divided into two portions: DCI_1 and DCI_2. The SRI field in DCI_1 includes information of the first category to indicate the global SRS resource(s) or SRS resource groups(s). The SRI field in DCI_2 includes information of the second category to indicate the local SRS resource(s) or SRS resource group(s). The global SRS resource(s) or SRS resource group(s) can be used for transmissions in all the ranks that the UE supports. The local SRS resource(s) or SRS resource group(s) can only be used for transmissions in a particular rank (e.g., rank R). The rank value is obtained based on the information in DCI_1.

As discussed in Example Embodiment 1, for transmission in rank-R, the base station can determine NR number of candidate resource groups among M number of configured resources in a resource set, where $1 \leq R \leq M$. The value of M is determined based on the number of antenna ports supported: it can be four, six, or eight; its value can also be extended to greater than eight for future generations of mobile devices. Each reference group includes R number of resources, and $NR < C_M^R$. The NR candidate groups can be predetermined, or signaled to the UE via higher layer signaling.

In DCI_1, the number of bits for the SRI field can be $\log_2(\Sigma_{i=1}^{Rmax} N_i)$, where Rmax is the maximum number of antenna ports supported by the UE. After the UE receives DCI_1 successfully, the UE can continue to detect DCI_2. In DCI_2, the number of bits for the SRI field can be $\log_2(N_{Rmax})$ for each sub-band. DCI_1 indicates wideband SRS resources, while DCI_2 indicates sub-band SRS resources.

In some embodiments, the number of sub-bands can be indicated by DCI_1. The SRI field in DCI_1 can also carry sub-band information for a first subset of sub-bands. For example, the first sub-band, the last sub-band, or the sub-band in the middle can be included in the first subset. The SRI field in DCI_2 then carries information for the remaining sub-bands.

In some embodiments, multiple candidate resource groups are known a priori to the base station and the UE. DCI_2 can include a field to indicate which candidate resource group is to be used for uplink transmissions. For example, as shown in Example Embodiment 5, two candidate resource groups are configured for transmissions in rank 1 to 4. DCI_2 can include a bit to indicate which candidate group is to be used for subsequent data transmissions.

If DCI_2 is not transmitted successfully (or UE fails to detect DCI_2 successfully), the PUSCH transmission will be performed based solely on the SRI field in DCI_1. If DCI_2 is transmitted successfully and detected by the UE successfully, the PUSCH transmission is then performed based on information in both DCI_1 (for the predetermined set of sub-bands) and DCI_2 (for the remaining sub-bands).

Example Embodiment 7

This embodiment describes additional examples for a two-stage downlink control transmission scheme for sub-band SRS resource indications.

As discussed in Example Embodiment 5, the base station can determine various orders of SRS resource in the resource set, with each order constituting a candidate resource group. In some implementations, the SRI field can indicate both rank information and SRS resources.

For example, the SRI field in DCI_1 can be used to indicate both rank information and a set of SRS resources (e.g., see Table 1). The SRI field in DCI_2, on the other hand, indicate a candidate set of SRS resources having a particular order.

In some embodiments, the number of sub-bands can be indicated by DCI_1. The SRI field in DCI_1 can also carry sub-band information for a predetermined set of sub-bands. For example, the first sub-band, the last sub-band, or the sub-band in the middle can be included in the predetermined set. The SRI field in DCI_2 then carries information for the remaining sub-bands.

If DCI_2 is not transmitted successfully (or UE fails to detect DCI_2 successfully), the SRI field in DCI_1 carries information for the wideband, and the PUSCH transmission will be performed based solely on the SRI field in DCI_1. If DCI_2 is transmitted successfully and detected by the UE successfully, the PUSCH transmission is then performed based on information in both DCI_1 (for the predetermined set of sub-bands) and DCI_2 (for the remaining sub-bands).

Figure 2:
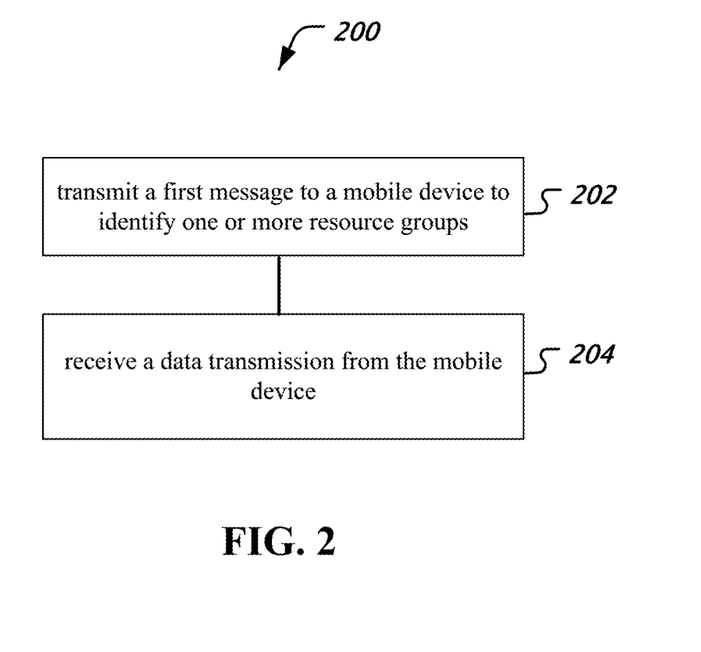
FIG. 2 is a flowchart representation of a method for wireless communication.

FIG. 2 is a flowchart representation of a method 200 for wireless communication. The method 200 includes, at 202, transmitting, from the wireless communication node, a first message to a mobile device. The first message identifies one or more resource groups that correspond to a transmission rank to be used by the mobile device for a data transmission from the mobile device to the wireless communication node. The one or more resource groups can indicate a precoding parameter for the data transmission. The one or more resource groups are selected from a set of candidate resource groups or a set of candidate resources. The method 200 also includes, at 204, receiving, at the wireless communication node, the data transmission having the transmission rank from the mobile device. The data transmission can be pre-coded by the coding parameter indicated by the one or more resource groups.

In some embodiments, the method includes transmitting, from the wireless communication node, a second message to the mobile device prior to transmitting the first message. The second message identifies the set of candidate resource groups or the set of candidate resources. In some embodiments, the second message identifies a plurality sets of candidate resource groups or candidate resources, each set of candidate resource groups or candidate resources corresponding to a different rank. In some embodiments, individual sets of candidate resource groups or candidate resources include the same resources in different orders. In some embodiments, the second message comprises one or more bitmaps for identifying the set of candidate resources in a configured resource set. In some implementations, each bitmap represents one or more candidate resources corresponding to a different rank.

In some embodiments, the set of candidate resource groups or the set of candidate resources is known a priori to the mobile device.

In some embodiments, a candidate resource group or candidate resources corresponding to a rank R include at least R resources in the configured resource set, R being greater than or equal to 1. In some implementations, a candidate resource group or candidate resources corresponding to rank R+1 include resources in a candidate resource group or candidate resources corresponding to rank R. In some implementations, candidate resources corresponding to rank R include first R+SR resources in the configured resource set. SR is greater than or equal to zero. SR can be known a priori to the wireless communication node or can be configured by a higher-layer signaling message.

In some embodiments, candidate resources or resource in a candidate resource group are organized in a different order than resources in a configured reset set. For example, candidate resources or resource in a candidate resource group can be organized in a descending order based on channel conditions such that a resource with a lower index value corresponds to a better channel condition.

In some embodiments, the data transmission is performed in a transmission band that includes multiple sub-bands. The one or more resource groups in the first message form a first portion of scheduling information. The first portion of the scheduling information indicates a transmission rank and resources for a first subset of the sub-bands within the transmission band. The method further includes transmitting, from the wireless communication node, a third message to the mobile device. The third message identifies one or more resource groups that form a second portion of the scheduling information. The second portion of the scheduling information indicates resources for a second subset of sub-bands within the transmission band. In some implementations, the number of sub-bands in the second subset is indicated by the first message or a higher-layer signaling message.

Figure 3:
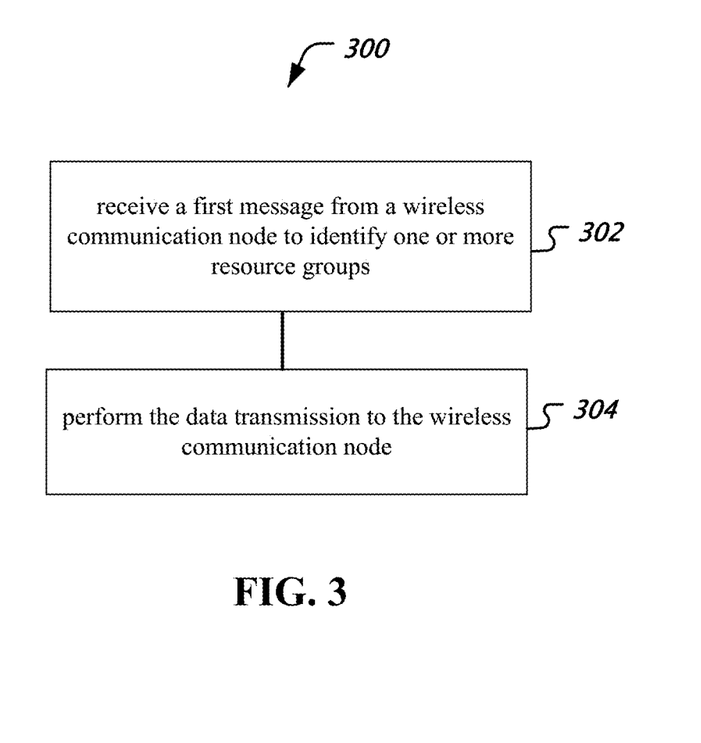
FIG. 3 is a flowchart representation of another method for wireless communication.

FIG. 3 is a flowchart representation of a method 300 for wireless communication. The method 300 includes, at 302, receiving, at a mobile device, a first message from a wireless communication node. The first message identifies one or more resource groups that correspond to a transmission rank to be used by the mobile device for a data transmission from the mobile device to the wireless communication node. The one or more resource groups indicate a precoding parameter for the data transmission. The one or more resource groups are selected from a set of candidate resource groups or a set of candidate resources. The method 300 may include applying the precoding parameter indicated by the one or more resource groups to the data transmission having the transmission rank. The method 300 also includes, at 304, performing, from the mobile device, the data transmission having the transmission rank to the wireless communication node.

In some embodiments, the method includes receiving, at the mobile device, a second message from the wireless communication node prior to receiving the first message. The second message identifies the set of candidate resource groups or the set of candidate resources.

In some embodiments, the second message identifies a plurality sets of candidate resource groups or candidate resources, each set of candidate resource groups or candidate resources corresponding to a different rank. In some implementations, individual sets of candidate resource groups or candidate resources include the same resources in different orders. In some embodiments, the second message comprises one or more bitmaps for identifying the set of candidate resources in a configured resource set. In some implementations, each bitmap represents one or more candidate resources corresponding to a different rank.

In some embodiments, the set of candidate resource groups or the set of candidate resources is known a priori to the mobile device.

In some embodiments, a candidate resource group or candidate resources corresponding to a rank R include at least R resources in the configured resource set, R being greater than or equal to 1. In some implementations, a candidate resource group or candidate resources corresponding to rank R+1 include resources in a candidate resource group or candidate resources corresponding to rank R. In some implementations, candidate resources corresponding to rank R include first R+SR resources in the configured resource set. SR is greater than or equal to zero. SR can be known a priori to the mobile device or can be configured by a higher-layer signaling message.

In some embodiments, candidate resources or resources in a candidate resource group are organized in a different order than resources in a configured reset set. For example, candidate resources or resource in a candidate resource group can be organized in a descending order based on channel conditions such that a resource with a lower index value corresponds to a better channel condition.

In some embodiments, performing the data transmission includes performing the data transmission using resources corresponding to the one or more resource groups. The resources are selected from a configured resource set and are organized in a predetermined order.

In some embodiments, the data transmission is performed in a transmission band that includes multiple sub-bands. The one or more resource groups in the first message form a first portion of scheduling information. The first portion of the scheduling information indicates a transmission rank and resources for a first subset of the sub-bands within the transmission band. The method further includes transmitting, from the wireless communication node, a third message to the mobile device. The third message identifies one or more resource groups that form a second portion of the scheduling information. The second portion of the scheduling information indicates resources for a second subset of sub-bands within the transmission band. In some implementations, the number of sub-bands in the second subset is indicated by the first message or a higher-layer signaling message.

Figure 4:
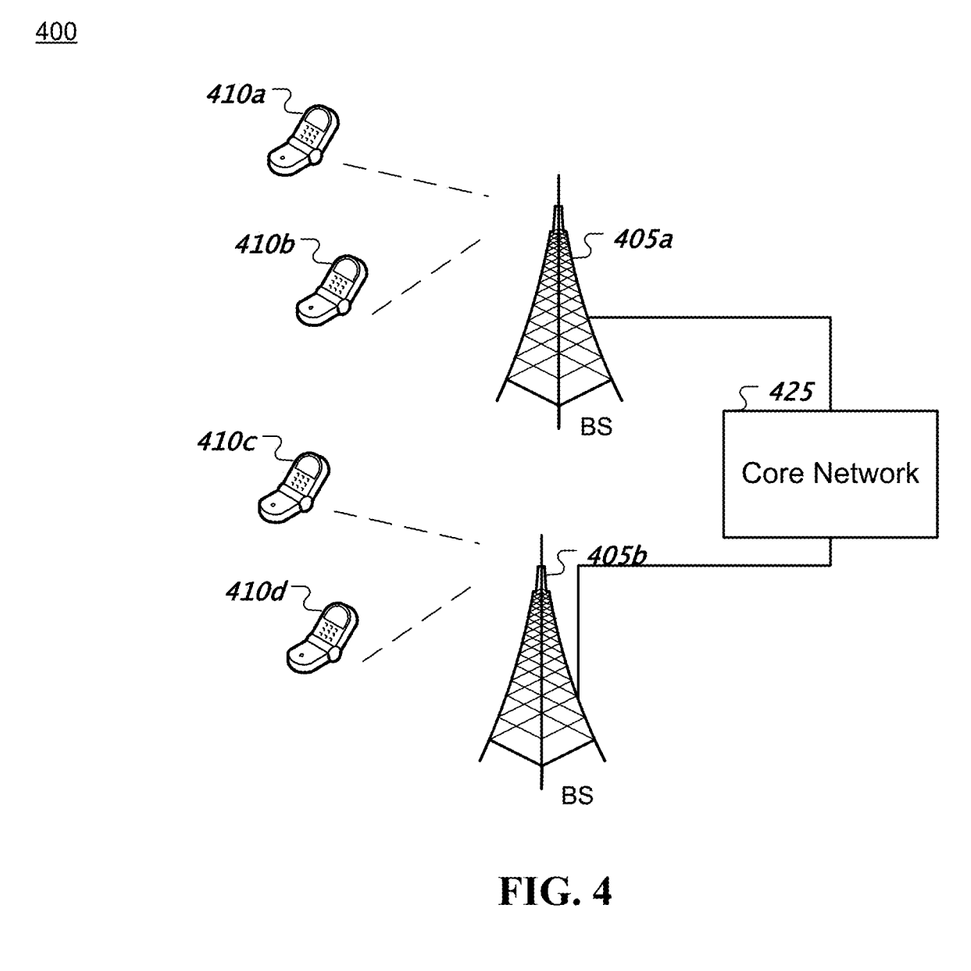
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
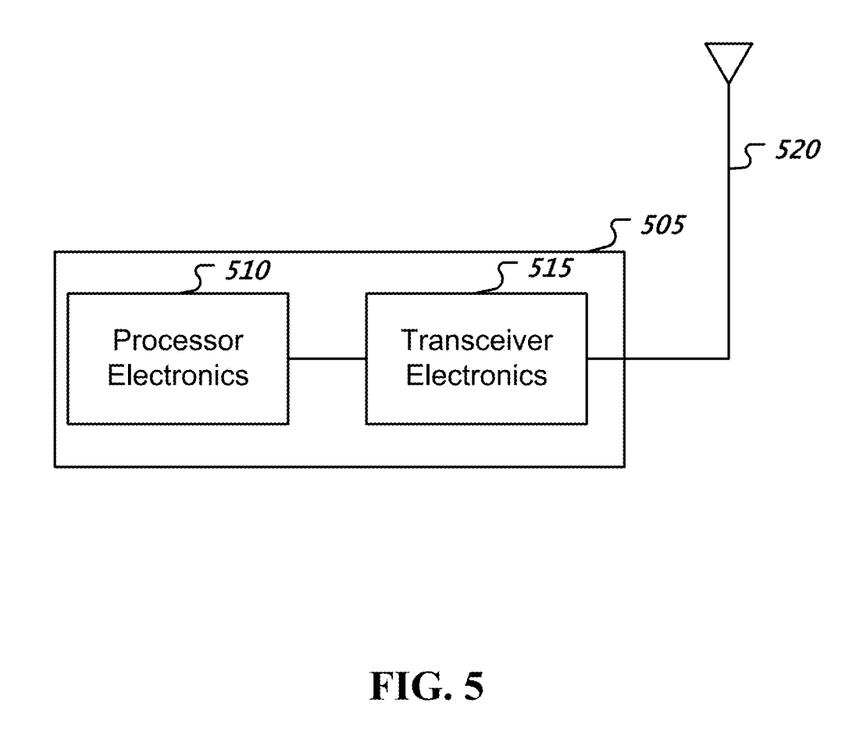
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It is thus evident that methods and corresponding apparatus relating to resource signaling for facilitating uplink transmissions are disclosed. The disclosed techniques can be used in various embodiments to reduce signaling overhead for indicating resources used in reference signal transmissions, thereby facilitating precoder determination for uplink transmissions.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
transmitting, from a wireless communication node, a first message to a mobile device, the first message identifying one or more Sounding Reference Signal (SRS) resource groups that correspond to a transmission rank to be used by the mobile device for a data transmission from the mobile device to the wireless communication node, wherein the one or more SRS resource groups are selected from candidate SRS resources that are known a priori to the mobile device or identified in a second message from the wireless communication node to the mobile device; and
receiving, by the wireless communication node, the data transmission having the transmission rank from the mobile device.

2. The method of claim 1, wherein the candidate SRS resources are organized in a plurality sets of candidate SRS resource groups or a plurality sets of candidate SRS resources, each set of candidate SRS resource groups or each set of candidate SRS resources corresponding to a different rank.

3. The method of claim 2, wherein a candidate SRS resource group or candidate SRS resources corresponding to rank R+1 include resources in a candidate SRS resource group or candidate SRS resources corresponding to rank R.

4. The method of claim 2, wherein a candidate SRS resource group or candidate SRS resources corresponding to rank R include first R+SR resources in an SRS resource set, $S_R$ being greater than or equal to zero.

5. The method of claim 2, wherein candidate SRS resources or resources in a candidate SRS resource group are organized in a different order than resources in a configured SRS resource set.

6. The method of claim 1, wherein the data transmission is performed in a transmission band that includes multiple sub-bands, and wherein one or more SRS resource groups in the first message form a first portion of scheduling information, the first portion of the scheduling information indicating a transmission rank and resources for a first subset of the multiple sub-bands within the transmission band, the method further comprising: transmitting, from the wireless communication node, a third message to the mobile device, the third message identifying one or more SRS resource groups that form a second portion of the scheduling information, the second portion of the scheduling information indicating resources for a second subset of multiple sub-bands within the transmission band.

7. A method for wireless communication, comprising:
receiving, by a mobile device, a first message from a wireless communication node, the first message identifying one or more Sounding Reference Signal (SRS) resource groups that correspond to a transmission rank to be used by the mobile device for a data transmission from the mobile device to the wireless communication node, wherein the one or more SRS resource groups are selected from candidate SRS resources that are known a priori to the mobile device or identified in a second message from the wireless communication node to the mobile device; and performing, by the mobile device, the data transmission having the transmission rank to the wireless communication node.

8. The method of claim 7, wherein the candidate SRS resources are organized in a plurality sets of candidate SRS resource groups or a plurality sets of candidate SRS resources, each set of candidate SRS resource groups or candidate SRS resources corresponding to a different rank.

9. The method of claim 8, wherein a candidate SRS resource group or candidate SRS resources corresponding to rank R+1 include resources in a candidate SRS resource group or candidate SRS resources corresponding to rank R.

10. The method of claim 8, wherein a candidate resource group or candidate SRS resources corresponding to rank R include first $R+S_R$ resources in an SRS resource set, SR being greater than or equal to zero.

11. The method of claim 8, wherein candidate SRS resources or resources in a candidate SRS resource group are organized in a different order than resources in a configured resource set.

12. The method of claim 7, wherein the data transmission is performed in a transmission band that includes multiple sub-bands, and wherein the one or more SRS resource groups in the first message form a first portion of scheduling information, the first portion of the scheduling information indicating a transmission rank and resources for a first subset of the multiple sub-bands within the transmission band, the method further comprising: transmitting, by the wireless communication node, a third message to the mobile device, the third message identifying one or more SRS resource groups that form a second portion of the scheduling information, the second portion of the scheduling information indicating resources for a second subset of multiple sub-bands within the transmission band.

13. A wireless communications apparatus comprising: a processor; and a memory including processor executable code, wherein the processor executable code upon execution by the processor configures the processor to: transmit a first message to a mobile device, the first message identifying one or more Sounding Reference Signal (SRS) resource groups that correspond to a transmission rank to be used by the mobile device for a data transmission from the mobile device to the wireless communication apparatus, wherein the one or more SRS resource groups are selected from candidate SRS resources that are known a priori to the mobile device or identified in a second message from the wireless communication apparatus to the mobile device; and receive the data transmission having the transmission rank from the mobile device.

14. The wireless communications apparatus of claim 13, wherein the candidate SRS resources are organized in a plurality sets of candidate SRS resource groups or a plurality sets of candidate SRS resources, each set of candidate SRS resource groups or candidate SRS resources corresponding to a different rank.

15. The wireless communications apparatus of claim 14, wherein a candidate SRS resource group or candidate SRS resources corresponding to rank R+1 include resources in a candidate SRS resource group or candidate SRS resources corresponding to rank R, and wherein the candidate SRS resource group or the candidate SRS resources corresponding to rank R include first R+$S_R$ resources in an SRS resource set, $S_R$ being greater than or equal to zero.

16. The wireless communications apparatus of claim 13, wherein the data transmission is performed in a transmission band that includes multiple sub-bands, and wherein the one or more SRS resource groups in the first message form a first portion of scheduling information, the first portion of the scheduling information indicating a transmission rank and resources for a first subset of the multiple sub-bands within the transmission band, wherein the processor is further configured to: transmit a third message to the mobile device, the third message identifying one or more resource groups that form a second portion of the scheduling information, the second portion of the scheduling information indicating resources for a second subset of multiple sub-bands within the transmission band.

17. A wireless communications apparatus comprising: a processor; and a memory including processor executable code, wherein the processor executable code upon execution by the processor configures the processor to: receive a first message from a wireless communication node, the first message identifying one or more Sounding Reference Signal (SRS) resource groups that correspond to a transmission rank to be used by the wireless communications apparatus for a data transmission to the wireless communication node, wherein the one or more SRS resource groups are selected from candidate SRS resources that are known a priori to the wireless communications apparatus or identified in a second message from the wireless communication node to the wireless communications apparatus; and perform the data transmission having the transmission rank to the wireless communication node.

18. The wireless communications apparatus of claim 17, wherein the candidate SRS resources are organized in a plurality sets of candidate SRS resource groups or a plurality sets of candidate SRS resources, each set of candidate SRS resource groups or candidate SRS resources corresponding to a different rank.

19. The wireless communications apparatus of claim 18, wherein a candidate SRS resource group or candidate SRS resources corresponding to rank R+1 include resources in a candidate SRS resource group or candidate SRS resources corresponding to rank R, and wherein the candidate SRS resource group or the candidate SRS resources corresponding to rank R include first R+$S_R$ resources in an SRS resource set, $S_R$ being greater than or equal to zero.

20. The wireless communications apparatus of claim 17, wherein the data transmission is performed in a transmission band that includes multiple sub-bands, and wherein the one or more SRS resource groups in the first message form a first portion of scheduling information, the first portion of the scheduling information indicating a transmission rank and resources for a first subset of the multiple sub-bands within the transmission band, and wherein the processor is further configured to: transmit a third message to the mobile device, the third message identifying one or more resource groups that form a second portion of the scheduling information, the second portion of the scheduling information indicating resources for a second subset of multiple sub-bands within the transmission band.

* * * * *